F. MULLER.
SINE BAR.
APPLICATION FILED JAN. 22, 1917.
1,231,185.
Patented June 26, 1917.
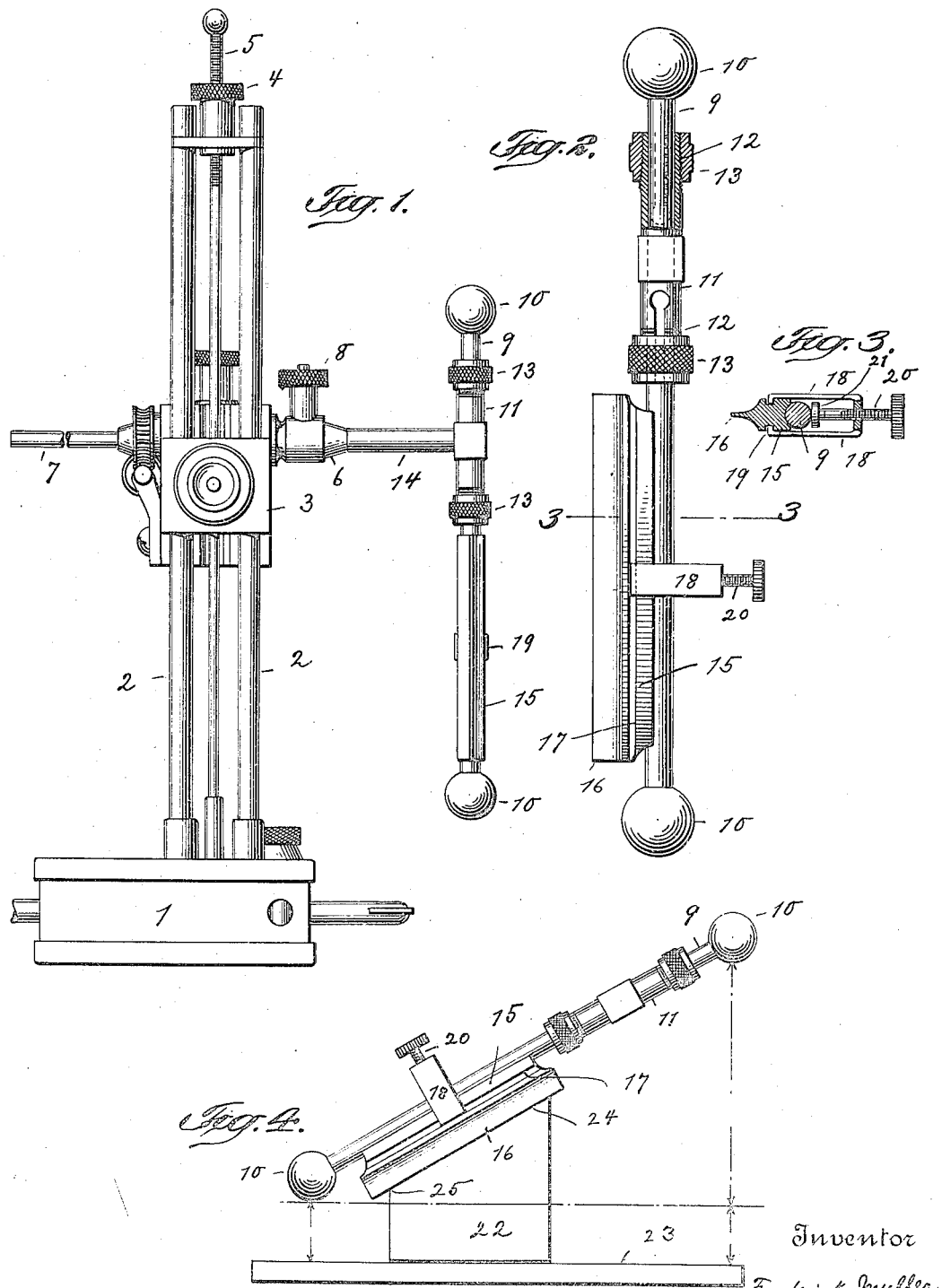

UNITED STATES PATENT OFFICE.

FREDERICK MULLER, OF ELIZABETH, NEW JERSEY.

SINE-BAR.

1,231,185.　　　　　Specification of Letters Patent.　　Patented June 26, 1917.

Application filed January 22, 1917.　Serial No. 143,686.

*To all whom it may concern:*

Be it known that I, FREDERICK MULLER, a citizen of the United States, and a resident of Elizabeth, in the county of Union and State of New Jersey, have invented certain new and useful Improvements in Sine-Bars, of which the following is a specification.

This invention relates to a sine bar of novel construction and more particularly to an improvement upon the sine bar embodied in Patent No. 1179551, issued to me April 18, 1916.

The sine bar described in said patent is furnished with a pair of balls which must come to rest upon the work piece before the proper measurement can be taken. The present invention has for its object, to permit a ready measurement of the angles of those work pieces which are shorter than the distance between the balls, so that one and the same sine bar may be used for work pieces which vary considerably in size.

The invention consists in the various features of novelty more fully described in the specification and appended claims.

In the accompanying drawing:

Figure 1 is a front elevation of a holder carrying a sine bar embodying my invention;

Fig. 2, a side view partly in section of the sine bar detached;

Fig. 3, a section on line 3—3 Fig. 2, and

Fig. 4, a diagram showing the sine bar in use.

The sine bar constructed as hereinafter described, is carried by a support which permits the same to be lowered upon the work piece, the angle of which is to be ascertained. Such a support is for example described in Patent No. 1217487 granted to me February 27th, 1917. Briefly stated, it consists of a base 1, from which extend upwardly a pair of rods 2, engaged by a slide 3 which may be set vertically by means of set screw 4 and screw rod 5. Slide 3 carries a rotatable sleeve 6, that contains rotatably and axially movable spindle 7, which may be clamped to the sleeve by means of a screw 8. The construction of the support may, however, be varied and does not form part of the present invention.

The sine bar proper consists of a bar 9 carrying a rounded head or ball 10 at each of its ends, such as described in Patent No. 1179551 hereinabove referred to. With the construction described in said patent, it is necessary that both balls be placed upon or against the inclined surface of the work piece, the angle of which is to be ascertained. It sometimes occurs, however, in practice, that the length of such inclined surface, is less than the distance between the balls, in which case the tool can not be used. In order to overcome this objection, I have devised the following construction:

Bar 9 is encompassed in part by a tubular sleeve or apertured holder 11, which is shorter than the bar and has split and threaded ends 12 which may be tightened upon the bar by nuts 13. In this way, the bar may be rotated and axially adjusted within the sleeve and may then be secured in position by means of the nuts. From sleeve 11, there projects at right angles, a socket 14 into which one end of spindle 7 is firmly stepped.

To bar 9, there is adapted to be removably secured between sleeve 11 and one of the balls 10, a straight edge or gage 15 which is arranged in exact parallelism with the axis of the bar and is of a width to extend some distance beyond the periphery of balls 10. At its heel, straight edge 15 is grooved to fit against bar 9, while the sides of the straight edge extend first in parallelism, and are then hollowed, to form a sharp working edge 16 adapted to be placed squarely against the work piece. Between the parallel and the hollowed sections of the straight edge, there is formed, a pair of longitudinal grooves 17 adapted to be engaged by a clamp which serves to removably attach the straight edge to bar 9. This clamp is provided with a pair of resilient jaws 18, having inwardly turned ends 19 that enter grooves 17. Into a cross piece connecting the jaws, is tapped a set screw 20, having a foot 21, adapted to bear against bar 9.

When the set screw is slackened, the straight edge may be turned around or slid along the bar, after which the set screw is tightened up to lock the straight edge in position.

In use, the work piece 22 is placed upon a bench 23, and the holder is so manipulated, that the straight edge 15 comes to rest squarely upon, and to thus parallel, inclined surface 24 of the work piece. Inasmuch as the operative edge 16 is always parallel to the axis of bar 9, the latter will now likewise parallel surface 24.

Measure the distance between the lowest points of balls 10 from bench 23, and subtract these distances from each other. Divide the quantity thus obtained by the fixed unit of bar 9 (between centers of balls 10) to obtain the sine of angle 25, which may now be looked up in a sine table.

I claim:

1. A sine bar comprising a bar having rounded heads, an apertured holder engaging the bar between said heads, a straight edge adapted to be secured to said bar in parallelism therewith, said straight edge projecting a distance beyond the heads, and means for securing said straight edge to said bar.

2. A sine bar comprising a bar having rounded heads, an apertured holder engaging the bar between said heads, a straight edge adapted to be adjustably secured to said bar in parallelism therewith, said straight edge projecting a distance beyond the heads, and means for securing said straight edge to said bar.

3. A sine bar comprising a bar having rounded heads, a sleeve encompassing part of the bar, a straight edge adapted to be secured to said bar between said sleeve and one of said heads, said straight edge being disposed parallel to the axis of the bar, and means for securing said straight edge to said bar.

4. A sine bar comprising a bar having rounded heads, a sleeve encompassing part of the bar, means for locking the bar to said sleeve, a straight edge carried by the bar and disposed parallel to the axis of the bar, and means for securing said straight edge to said bar between said sleeve and one of said heads.

5. A sine bar comprising a bar having rounded heads, a straight edge disposed parallel to the axis of the bar and having a pair of longitudinal grooves, and a clamp mounted on the bar and engaging said grooves.

6. A sine bar comprising a bar having rounded heads, a holder engaging the bar between said heads, a straight edge mounted on the bar between said holder and one of said heads, said straight edge having a sharp working edge that is arranged in parallelism with the axis of the bar and extends a distance beyond the heads, and a clamp that removably secures the straight edge to said bar.

FREDERICK MULLER.